United States Patent
Wu et al.

(10) Patent No.: US 7,873,943 B2
(45) Date of Patent: Jan. 18, 2011

(54) INSERTING STACK CLEARING CODE IN CONSERVATIVE GARBAGE COLLECTION

(75) Inventors: Gansha Wu, Beijing (CN); Xin Zhou, Beijing (CN); Peng Guo, Beijing (CN); Jinzhan Peng, Beijing (CN); Zhiwei Ying, Shanghai (CN); Guei-Yuan Lueh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1397 days.

(21) Appl. No.: 11/321,211

(22) Filed: Dec. 28, 2005

(65) Prior Publication Data
US 2007/0150868 A1    Jun. 28, 2007

(51) Int. Cl.
*G06F 9/44*    (2006.01)
*G06F 12/00*   (2006.01)
*G06F 17/30*   (2006.01)

(52) U.S. Cl. ....................................... 717/114; 707/813
(58) Field of Classification Search ........................ None
See application file for complete search history.

(56) References Cited

U.S. PATENT DOCUMENTS

| | | | | |
|---|---|---|---|---|
| 6,038,643 | A * | 3/2000 | Tremblay et al. | 711/132 |
| 6,105,041 | A * | 8/2000 | Bennett et al. | 1/1 |
| 6,550,058 | B1 * | 4/2003 | Wynn | 717/158 |
| 6,598,141 | B1 * | 7/2003 | Dussud et al. | 711/170 |
| 6,886,085 | B1 * | 4/2005 | Shuf et al. | 711/159 |
| 6,904,589 | B1 * | 6/2005 | Kolodner et al. | 717/116 |
| 2002/0120640 | A1 * | 8/2002 | Hills | 707/206 |

OTHER PUBLICATIONS

Ali-Reza Adl-Tabatabai et al., "Fast, Effective Code Generation in a Just-In-Time Java Compiler", 1998.*
Boehm, H. et al., "Garbage Collection in an Uncooperative Environment," Copyright 1988 by John Wiley and Sons, Ltd., pp. 1-17.
Boehm, H., "Space Efficient Conservative Garbage Collection," Conference on Programming Language Design and Implementation, 1993, pp. 1-10.
Barabash, K. et al., "Mostly Accurate Stack Scanning," Proceedings of the Java Virtual Machine Research and Technology Symposium (JVM '01), Apr. 23-24, 2001, Monterey, CA, USA.
Wu, G. et al., "XAMM: A High-Performance Automatic Memory Management System with Memory-Constrained Designs," Lecture Notes in Computer Science, vol. 3793, 2005, pp. 130-149.

* cited by examiner

*Primary Examiner*—Wei Y Zhen
*Assistant Examiner*—Lanny Ung
(74) *Attorney, Agent, or Firm*—Blakely, Sokoloff, Taylor & Zafman LLP

(57) ABSTRACT

A location to insert stack clearing code into a method to be executed in an execution environment of a computer system is determined. The stack clearing code is inserted into the location of the method. The stack clearing code is executed during execution of the method to clear a stack. Other embodiments are also described and claimed.

23 Claims, 7 Drawing Sheets

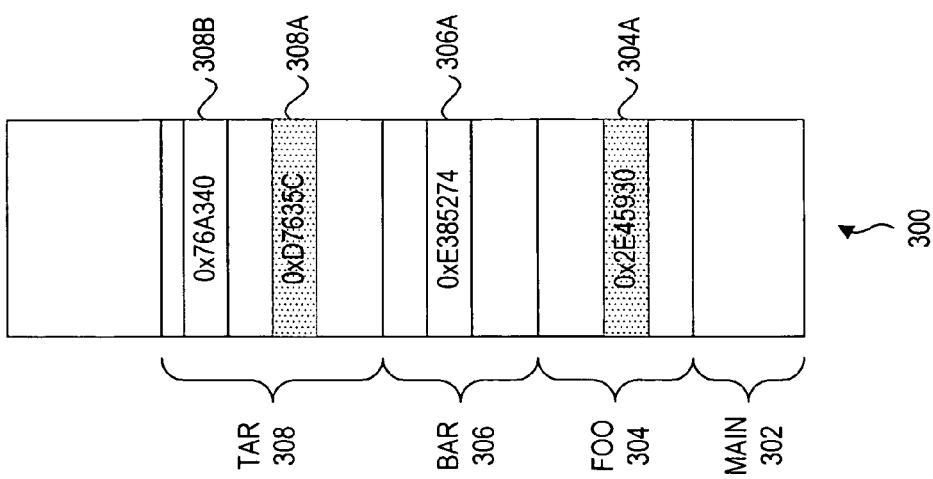
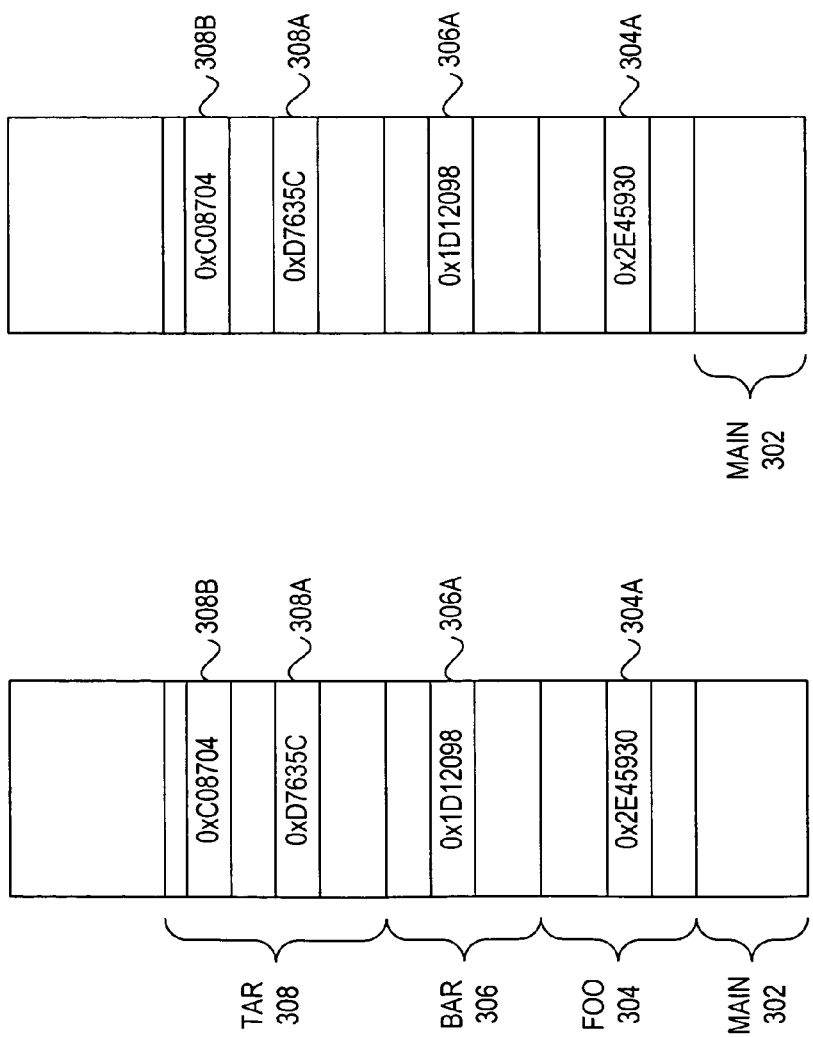
FIG. 3C
FIG. 3B
FIG. 3A

INSERTING STACK CLEARING CODE IN CONSERVATIVE GARBAGE COLLECTION

TECHNICAL FIELD

Embodiments of the invention relate to the field of computer systems and more specifically, but not exclusively, to inserting stack clearing code in conservative garbage collection.

BACKGROUND

Garbage collection refers to techniques to reclaim memory that has been allocated but is no longer being used. The reclaimed memory may then be put back into the general memory pool for re-allocation. Some programming languages perform garbage collection automatically, while other languages expect the programmer to code the management of garbage collection.

Garbage collection may involve scanning a stack for dead pointers. Dead pointers point to allocated objects that are no longer used. Once objects are only referred by dead pointers, they may be removed to free up memory space. Today's conservative garbage collection techniques fail to effectively remove dead pointers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3A is a diagram illustrating stack clearing in accordance with an embodiment of the invention.

FIG. 3B is a diagram illustrating stack clearing in accordance with an embodiment of the invention.

FIG. 3C is a diagram illustrating stack clearing in accordance with an embodiment of the invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Garbage Collection (GC) techniques include conservative garbage collection and accurate garbage collection. Conservative GC techniques usually involve treating any value that could signify a reference as one, such as values on a stack. Such techniques try to avoid excessive performance overhead and implementation complexity, but may result in leaving values on the stack that are indeed relating to garbage. Accurate GC techniques involve determining the location of references with certainty, but may significantly impact system performance and have greater complexity in implementation.

Conservative garbage collection is a memory management technique that is widely deployed in non-cooperative execution environments (EEs). To create a fully-cooperative environment, the EE must maintain managed pointers carefully to avoid misuse of dangling pointers, which may become a great complexity. By employing conservative GC, the EE implementation can be very simple and fast.

Taking Java™ or Microsoft®.NET as example execution environments, a Just-In-Time (JIT) compiler does not necessarily provide support for precise register and stack frame enumeration; instead, GC scans these areas conservatively and judiciously to collect roots. However, conservative GC compromises accuracy to keep the EE implementation simple. That is, dead objects may not be reclaimed timely. Also, since the logic cannot always tell whether a pointer is a root or not, some dead objects may be falsely retained by a spurious root.

Figure 1B:
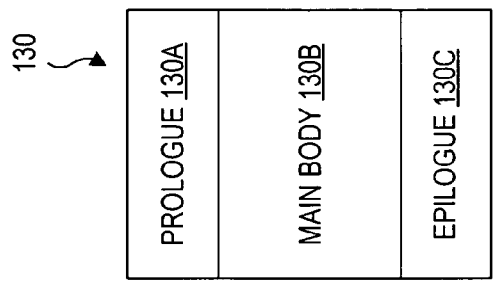
FIG. 1B is a diagram illustrating a method in accordance with an embodiment of the invention.
Figure 1:
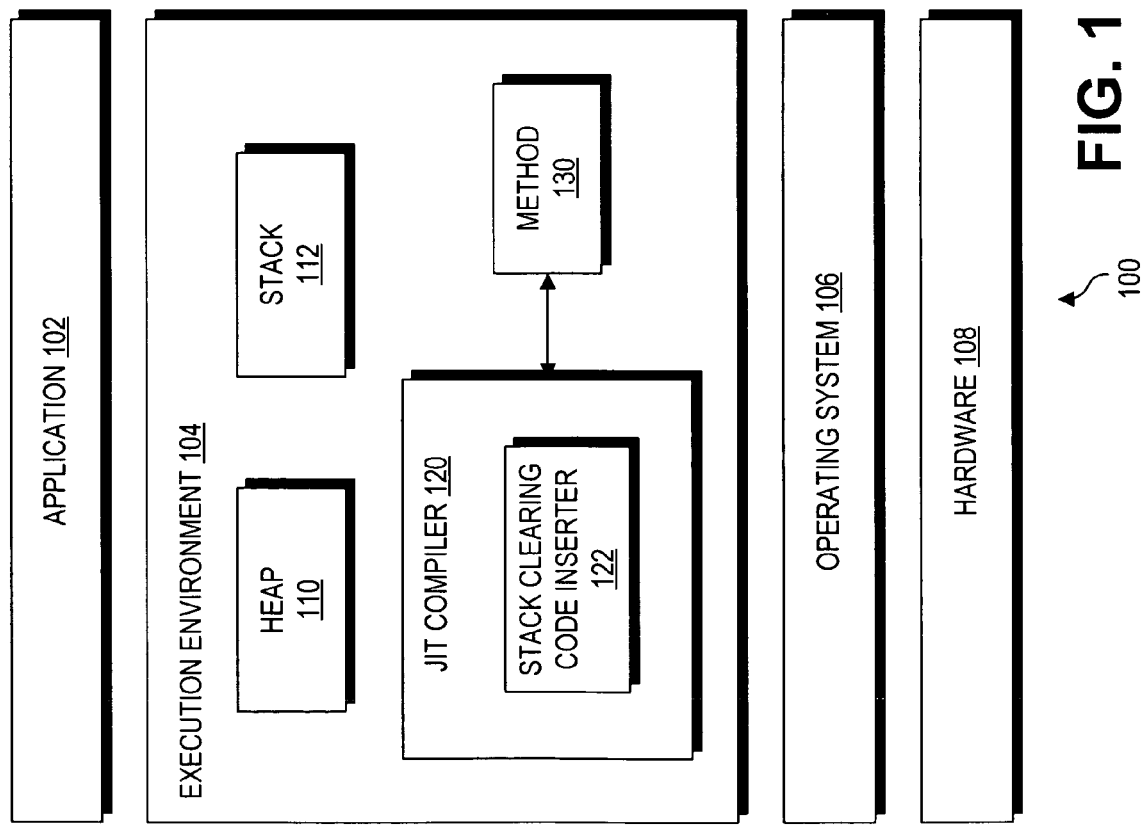
FIG. 1 is a diagram illustrating an execution environment in accordance with an embodiment of the invention.

FIG. 1 shows a logical diagram of a computer system 100 in accordance with an embodiment of the invention. It will be understood that embodiments of the invention are not limited to the logic structure of computer system 100. Further, while embodiments of the invention are described in connection with a Java™ execution environment, it will be understood that alternative execution environments may be used to implement embodiments of the invention.

Computer system 100 includes an application layer 102 supported by an execution environment (EE) 104. Execution environment 104 is supported by an operating system 106 which in turn is layered on computer system hardware 108. An execution environment may also be referred to as a runtime environment or a managed runtime environment (MRTE). Embodiments of EE 104 include a Java Virtual Machine™, Microsoft®.NET environment, or the like.

Execution environment 104 may dynamically load and execute code. Execution environment 104 may also provide automatic memory management. Such memory management may include garbage collection. Execution environment 104 may also support multi-threading. Such support may include providing for creation and management of threads and thread synchronization mechanisms.

EE 104 may allow application programs to be built that could be run on any platform without having to be rewritten or recompiled for each specific platform. Code designed for execution in an EE may be compiled to produce bytecode. Bytecode includes machine-independent code. At execution, the bytecode is converted into machine code for a targeted platform by a Just-In-Time (JIT) compiler executing on the end user's platform. The platform's processor may then execute the compiled bytecode. The JIT compiler is aware of the specific instructions and other particularities of the platform processor. For example, a Java™ language program may run in a Java Virtual Machine (JVM™) execution environment.

Embodiments of EE 104 may include a heap 110 and a stack 112. In general, heap 110 represents a portion of memory reserved for use by programs, such as applications in application layer 102. Stack 112 is used to store the status of various methods, procedures, or the like, during their execution. In a multi-threaded embodiment, each thread may have its own associated stack.

EE 104 may include a JIT compiler 120. JIT compiler 120 may convert source code into machine code just before the code is executed. In a Java™ embodiment, JIT complier 120 may convert bytecode into machine code. JIT compiler 120 may also include other features such as hot spot optimization and recompiling capability. EE 104 may also include an interpreter (not shown) for interpreting code for execution.

In the embodiment of FIG. 1, JIT compiler 120 includes a stack clearing code inserter 122 for performing code insertion for EE 104. As will be described further below, stack clearing code inserter 122 injects stack clearing code into a method or other runtime routines generated on the fly, such as a method 130, and the stack clearing code may proactively clear the stack at runtime when executed. Various policies for performing stack clearing code insertion will be discussed below. EE 104 may also include a garbage collection unit (not shown) for performing other garbage collection related tasks.

An embodiment of method 130 is shown in FIG. 1B. In one embodiment using object oriented programming, a method pertains to the processing that a type (known as "class" in some languages) performs. A type may also have associated fields that define data members. An application in application layer 102 may have many types. Each type may have one or more methods. Thus, an application may have hundreds of associated methods that are compiled and executed in EE 104. As described below, these methods may be candidates for clearing code insertion based on various policies and implementation designs.

Method 130 includes a prologue 130A, a main body 130B, and an epilogue 130C. Prologue 130A and epilogue 130C may manage administrative tasks such as calling conventions, pushing and popping the stack, thread switching, or the like. Main body 130B includes the main execution code of method 130.

Figure 2:
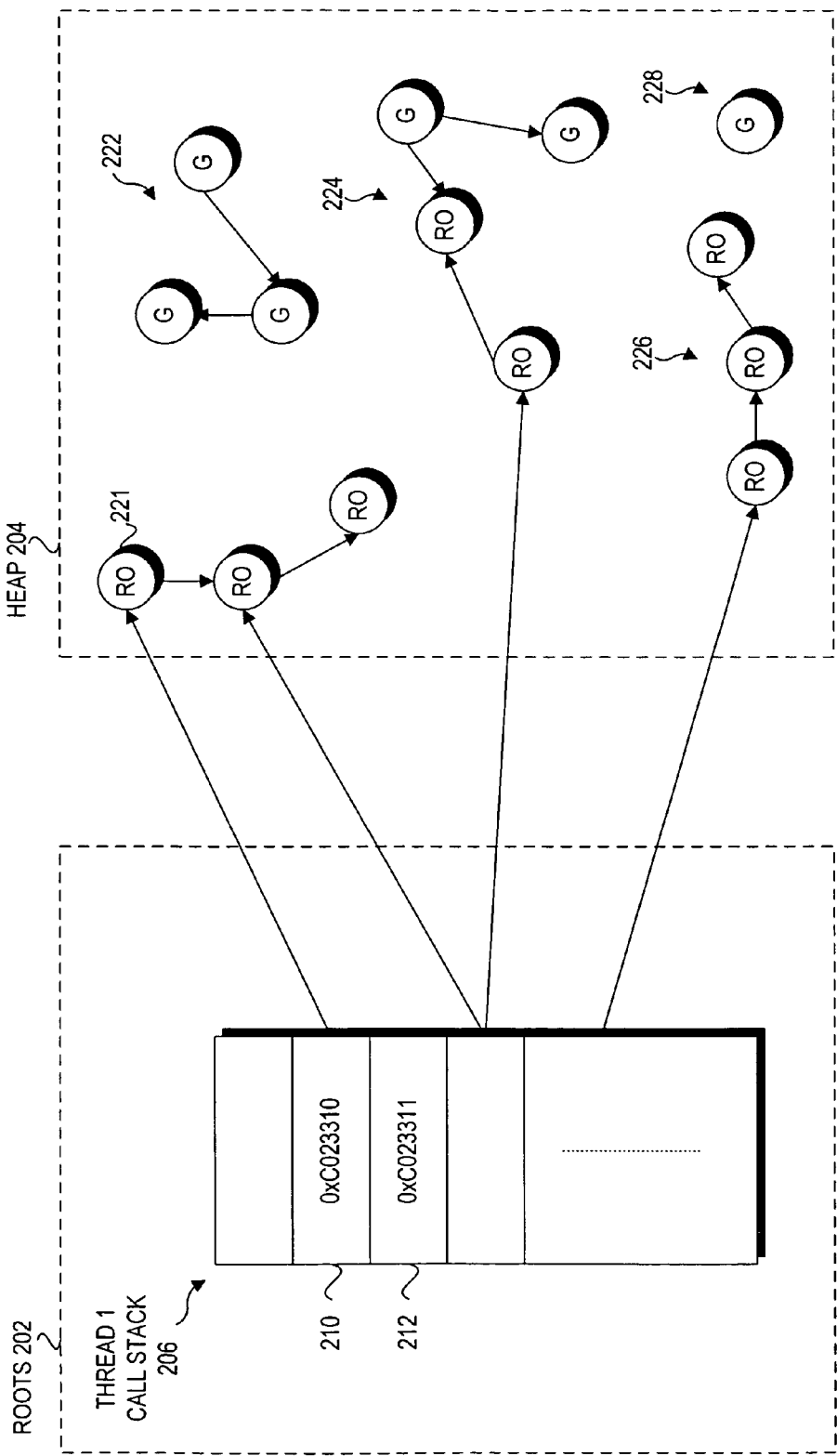
FIG. 2 is a diagram illustrating garbage collection in accordance with an embodiment of the invention.

Turning to FIGS. 2 and 3A-3E, further discussion of garbage collection is presented. FIG. 2 illustrates a process of stack scanning in conservative garbage collection. FIG. 2 shows roots 202 for the garbage collection. Roots 202 for thread 1 mainly reside on a call stack 206. In one embodiment, each thread has its own call stack. Heap 204 include objects stored in memory. A Reachable Object (RO) may be accessed using call stack 206. Garbage (G) is a dead object that is no longer reachable by call stack 206. It will be understood that "objects" in heap 204 are instantiations of types in Object Oriented Programming (OOP). In one embodiment, call stack 206 includes both Java stack entries and native stack entries. Java stack includes stack frames or Java methods, while native stack includes stack frames for methods not written in Java (e.g., native methods, EE runtime routines, or the like).

At the beginning of a GC cycle, a stack scanning routine walks through every slot of Thread 1's call stack 206 (indiscriminately for Java stack and native stack) and identifies slots that happen to contain legitimate reference values. For example, the value 0xC023310 (shown at 210) refers to a valid object (shown at 221), so the slot is treated as a root. The value 0xC023311 (shown at 212) is not a legal address, so the slot will be abandoned. However, in reality, the value 0xC023310 (shown at 210) may be just an integer or a reference to a dead object. Thus, value 0xC023310 may be misidentified as a valid object when indeed it points to a dead object.

Other examples of valid objects and dead objects are shown in heap 204. Garbage objects are shown at 222 and 228 because they have no pointers to them from call stack 206. At 226, reachable objects are shown. At 224, some objects are reachable objects, but others are garbage because pointers from the ROs at 224 do not provide for reaching the garbage objects.

To minimize falsely retained dead objects, conservative GC may provide a mechanism to screen out spurious pointers. A black-listing technique is one way to reduce the probability of misidentification. This technique guarantees that certain stack slots, once treated as not roots, will not be mistakenly brought back into consideration by later allocations. However, a black-listing technique may lead to some dead objects continuing to live through long cycles before these dead objects are overwritten. Such a delay between identifying dead objects and actually reclaiming the dead space wastes system resources. Embodiments described herein minimize such a delay.

Figure 3E:
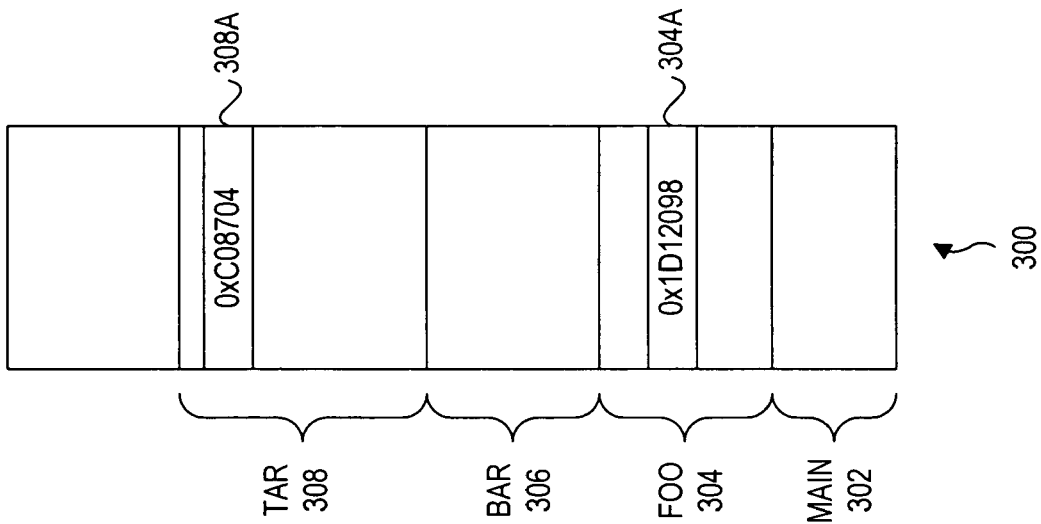
FIG. 3E is a diagram illustrating stack clearing in accordance with an embodiment of the invention.

FIGS. 3A-3E illustrate the effect of stack clearing on a stack 300 during various points of execution. For example, suppose the Main( ) method 302 has a loop whose each iteration contains a call chain Foo 304, Bar 306, and Tar 308, as shown in FIG. 3A. In one embodiment, Foo 304, Bar 306, and Tar 308 are different methods. During the execution, there are several stack slots containing live references. Some of theses references are shown at stack slots 304A, 306A, 308A and 308B.

When one iteration completes, all the calls to Foo 304, Bar 306, and Tar 308 are popped off of stack 300, as shown in FIG. 3B. The stack slots 304A, 306A, 308A and 308B in FIG. 3B are now dead references. Though some of these dead references might be overwritten by the next iteration, as illustrated by FIG. 3C, the grayed slots 304A and 308A remain and still refer to dead objects.

If garbage collection is performed on stack 300 at the state shown in FIG. 3C, the dead objects referred by slots 304A and 308A cannot be reclaimed because these slots are treated conservatively as live pointers.

Figure 3D:
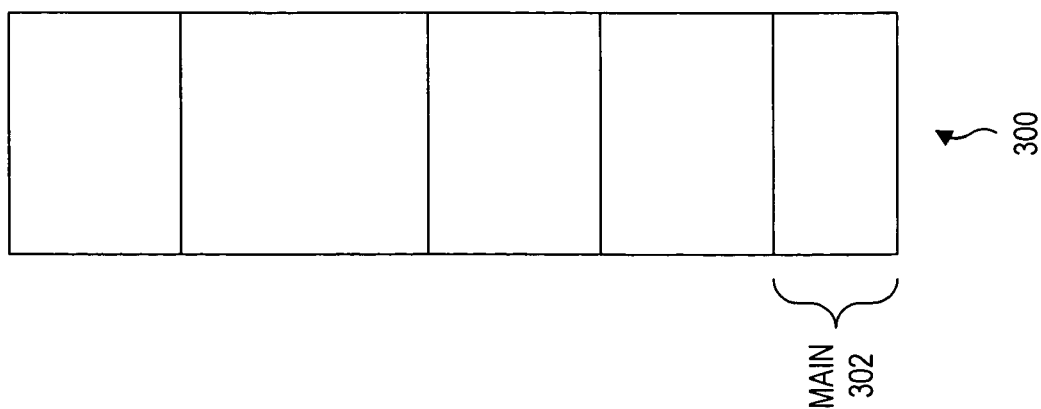
FIG. 3D is a diagram illustrating stack clearing in accordance with an embodiment of the invention.

But if the stack is cleared at the end of the iteration shown in FIG. 3D, then stack slots 304A and 308A may be cleared. Thus, the next iteration, as shown in FIG. 3E, does not suffer the space overhead from dead references as compared to FIG. 3C. In FIG. 3E, slots 304A and 308A are now usable for valid references.

Thus, performing stack clearing at a certain points during execution, such as shown in FIG. 3D, provide better stack clearing. Embodiments herein insert stack clearing code at points during execution that optimize the removal of dead objects. In the example of FIGS. 3A-3E, the stack clearing code may be inserted in a position at the end of an iteration of Main( ) 302, such as shown in FIG. 3D, to clear dead references from stack 300.

An embodiment of pseudo-code for the inserted stack clearing code is as follows:

```
if(good_timing_for_clearing( ))
    do_stack_clearing( );
```

Example implementations of good_timing_for_clearing( ) and do_stack_clearing( ) will be discussed below.

Embodiments of stack clearing as described herein may include the following considerations: where to insert the code, when to activate stack clearing, or the amount of stack space to clear during stack clearing. Determining when to active the stack clearing may involve implementations of good_timing_for clearing( ). Determining the amount of stack space to clear may involve implementations of do_stack_clearing( ).

In embodiments herein, to help performance evaluation, it is assumed the overheads from good_timing_for_clearing( ) and do_stack_clearing( ) are T and C respectively, and the probability for good_timing_for_clearing( ) to return true is P. Embodiments herein may include a design assumption that $T \ll C$ and $P \ll 1$.

Embodiments of inserting stack clearing code may reduce false retaining in the stack without lowering performance visibly. Garbage collection through stack clearing code insertion may maintain system performance while providing a simple EE implementation. While embodiments of code injection described herein introduce some extra overhead into the execution, the average memory working set is cut down by removing dead objects timely. Given that the EE implementation remains simple, the overall benefits outweigh any minimal overhead.

Embodiments herein may be applied to managed runtime environments in mobile and embedded systems, which use simple but effective designs. Embodiments of the present invention may provide garbage collection for execution environments of small systems and present a time and space efficient solution. Embodiments herein may be simpler than accurate GC and mostly accurate GC, but with similar effectiveness. Embodiments herein are more effective than traditional conservative GC.

Figure 4:
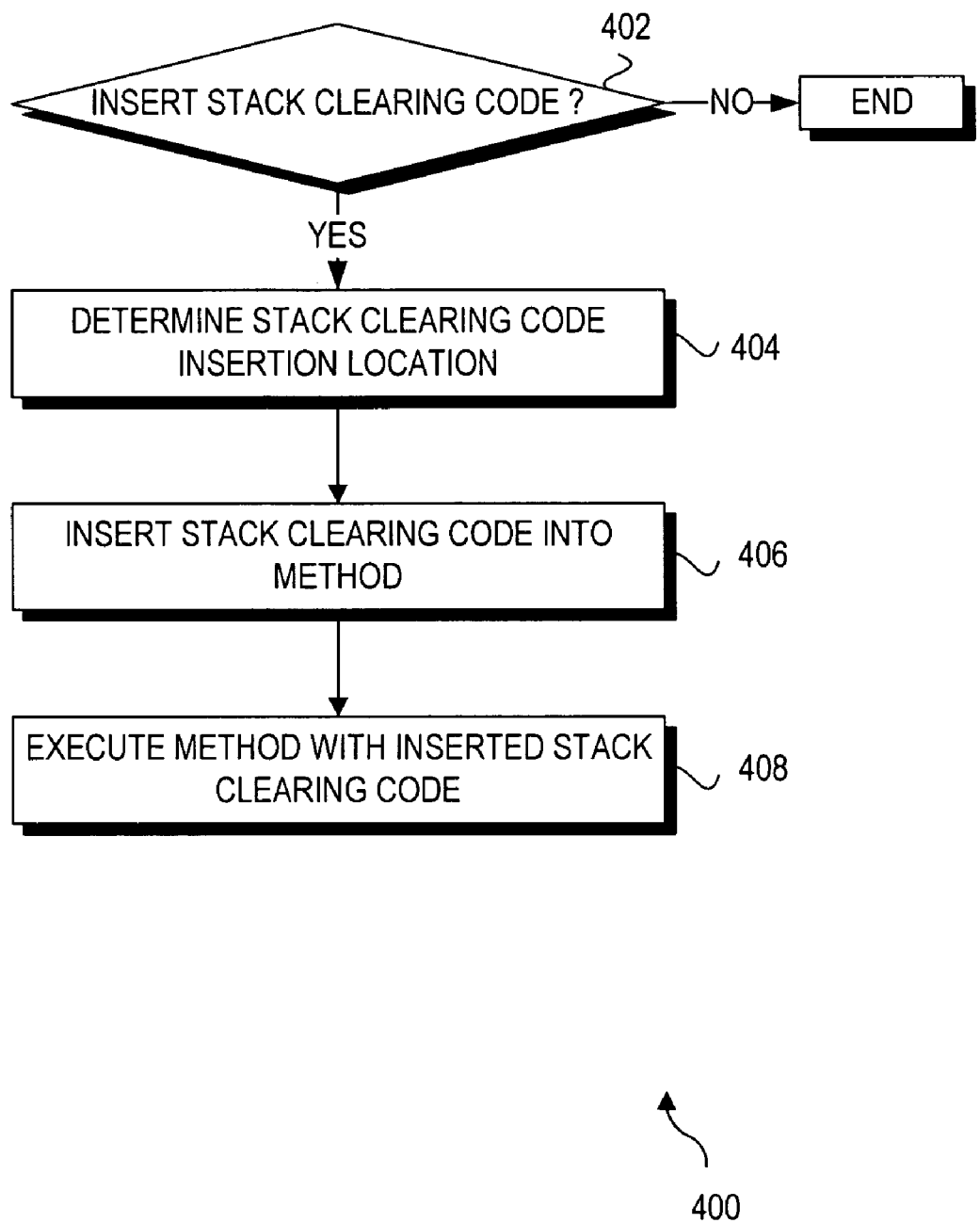
FIG. 4 is a flowchart illustrating the logic and operations to insert stack clearing code in accordance with an embodiment of the invention.

Turning to FIG. 4, a flowchart 400 shows an embodiment of logic and operations for performing garbage collection via stack clearing code insertion. In one embodiment, at least a portion of the logic of flowchart 400 may be implemented by an execution environment on a computer system. As described below, some aspects of flowchart 400 may be preprogrammed using offline analysis of a program and its methods.

Starting in a decision block 402, the logic determines whether to perform stack clearing code insertion in a method. If the answer is no, then flowchart 400 ends. Flowchart 400 may start again when another method is presented for compiling or the same method is presented for re-compiling. If the answer to decision block 402 is yes, then the logic proceeds to a block 404.

In embodiments herein, the code insertion occurs on the fly. In other words, EE 104 may decide whether to inject the code at all into a given method. In one embodiment, if the heap is not under high pressure, the EE 104 does not need to inject any clearing code. In this case, clearing dead objects from the heap is not worth the overhead to insert and execute stack clearing code. But when running short of space in the heap, EE 104 may recompile a certain portion of code to insert stack clearing code. Similarly, if heap pressure is lowered, then the method may be recompiled again to remove previously inserted stack clearing code. As used herein, heap pressure refers to the amount of available memory space in the heap. High pressure indicates little available memory space, while low pressure indicates a lot of available space.

Proceeding to a block 404, the logic determines the location in the method to insert the stack clearing code. At block 406, the code is inserted into the method at the location determined in block 404. In one embodiment, the code is inserted as part of the compiling process of a JIT compiler, when 130A, 130B and 130C in FIG. 1B are generated. As discussed below, the criteria for triggering the stack clearing code in the method may be determined statically or dynamically when the method is executed. Also discussed below, the amount of stack to clear may be determined statically or dynamically at the time of execution of the stack clearing code.

Continuing to a block 408, the method with the inserted stack clearing code is executed. As discussed further below, various conditions may be used for determining whether to execute the inserted stack clearing code during execution of the method.

Where To Insert Stack Clearing Code

Embodiments of an ideal place to insert the stack clearing code may be at a location with one or more of the following properties: 1) the stack clearing code insertion location should not be in a performance critical region, such that the execution speed will not be slowed down significantly even after the code injection; or 2) the stack clearing code insertion location should make the clearing operation as effective as possible. In other words, as many dead references as possible should be clearable and not "trapped" in an active execution region (as described above in conjunction with FIGS. 3C-3D).

In some embodiments, the code is inserted into the prologue or epilogue of methods. The methods may include non-native methods or native methods. In some instances, the stack clearing code may be inserted at loop back-edges of certain methods. In one embodiment, the stack clearing code is inserted as native machine code embedded in the compiled code.

A non-native method is a method written in a language, such as Java, that is not distributed in native code. For example, Java is distributed as bytecode and then compiled into native code by the target platform. Embodiments herein may insert stack clearing code into the native code generated by a JIT compiler when compiling non-native methods.

A native method is a method written in a language, such as C/C++ and its variations, that is distributed in native code. Native code includes the machine code for the processor of the computer system. In general, a non-native method, such as a Java method, cannot directly call a native method due to different conventions. So a native method stub is generated for a native method at compile time to allow a non-native method to call a native method. Embodiments herein may embed stack clearing code into the native method stub.

Similarly, non-native methods, such as Java methods, cannot call Execution Environment runtime routines, such as allocation or synchronization, directly. So a runtime stub is used; the non-native method calls the runtime stub which in turn calls the EE runtime routine. Certain runtime stubs, such as allocation or synchronization, may also leave dead pointers on the stack; so embodiments herein may inline stack clearing code into the runtime stub.

Example policies for stack clearing code insertion may include one or more of the following, however, embodiments herein are not required to have any of the following policies nor limited to any of the following polices: 1) inject code into prologues or epilogues, where the overhead per method is T+C*P; 2) inject code into both prologues and epilogues, where the overhead per method is 2*(T+C*P); or 3) inject the code at loop back-edges, where the overhead would be L*(T+C*P), assuming the average loop count is L.

To minimize the overall performance degradation by code insertion, EE 104 may apply injection policies to different methods or runtime stubs, based on static analysis or runtime profiling.

Embodiments herein may use the following policies for determining where to insert stack clearing code based on whether the method is a non-native method or a native method. These policies are to clear the stack as aggressively as possible, but still avoid degrading the overall performance. If P<<1, T+C*P roughly equals to T. If T is relatively small compared to the overall execution time of a method, the system can bear with the overhead.

NON-NATIVE METHODS: insert code into the epilogue, such that dead references can be removed immediately before the return. But the rule may be applied very carefully for non-native methods; most non-native methods are not candidates for inserting stack clearing code because they are frequently called and tend to be performance sensitive. If there does exist a need to inject code into non-native methods (for example, the heap is under tremendous pressure), leaf methods, very hot methods and performance critical methods may still be excluded because of the impact on system performance.

Some non-native methods may be candidates for code injection if it is determined statically that they may grow the stack significantly (for example, there could be a very deep call chain starting from these methods). The static analysis could be very simple and cheap, since it does not need to be whole-program or precise analysis.

Code may be injected at loop back-edges for some non-native methods if it is statically determined that each loop iteration involves a lot of method calls or object allocations (L is usually small in this case). For these cases, the code injection may be very effective in removing dead references and the overhead for each loop iteration may be amortized because the stack clearing overhead is relatively lightweight compared to those method calls and/or object allocations.

If it can be statically determined that some non-native methods run near the bottom of the call stack (for example, few calls away from main( ) or Thread.run( )), these methods can be deemed as candidates for insertion of stack clearing code. Stack clearing code may be injected in the epilogue (and prologue if the methods last long) or at back edges of heavy loops (L is usually small in this case).

NATIVE METHODS: generally, do not insert code into performance critical native methods, for example, a system.arraycopy( ). But for other native methods, the insertion is done into the native method stubs and the overhead to check whether the clearing code is to be executed (for example, if good_timing_for_clearing( ) is true) may be amortized by the long instruction sequence of stub code.

For immediately-returned native methods, the code may be inserted into the epilogue of native method stubs, such that dead references can be removed immediately before the return.

For long-running native methods (for example, Object.wait( ) or Thread.sleep( )), the code may be inserted into the prologue and/or the epilogue of native method stubs. Since these native methods could be interrupted by GC, dead references may be cleared in the prologue.

Code may be inserted into both prologues and epilogues for some runtime stubs, such as a GC invocation stub, since GC may grow the stack significantly and leave many object references on the stack.

When To Execute Inserted Stack Clearing Code

Determining when to execute the inserted stack clearing code may entail determining when good_timing_for_clearing( ) is to be returned as true. To minimize the overall clearing overhead, the assumption of P<<1 is considered; T should also be set as small as possible since the good_timing_for clearing( ) check will take place each time on the execution path.

Embodiments of triggering the execution of the stack clearing code include randomly, periodically, or selectively. An embodiment of randomly triggering the code may employ a random generator to produce random numbers between 0 and 99. If the number is smaller than P*100, good_timing_for_clearing( ) is returned as true.

An embodiment using periodicity may employ a counter with an initial value of 0 and a maximum value of N−1, where N=1/P. When the counter reaches N−1, good_timing_for_clearing( ) is returned as true and the counter is reset to 0.

In yet another embodiment, good_timing_for_clearing( ) is returned as true selectively based on current runtime context. In one embodiment, the size of the stack may be used in evaluating the current runtime context, in other words, whether the stack is shallow enough. Stack size may be measured as the distance between the stack pointer and the bottom of the stack. This stack size may be compared to a stack size threshold in determining if the stack is small enough for performing stack clearing. As described above in conjunction with FIG. 3D, performing stack clearing on a shallow stack provides more opportunity to clear dead references from the stack.

In one embodiment, since the stack bottom is usually well aligned and the stack pointer can be very lightweight (for example, the stack pointer may be a register), then good_timing_for_clearing( ) may be as simple as the following pseudo-code:

--- return (Stack Pointer AND Mask) <Stack Size Threshold

---

One skilled in the art will understand that Mask is used to filter out a base address value of the Stack Pointer to get the actual stack size which is compared to the Stack Size Threshold.

In this embodiment, when the stack is shallow enough, it's likely that the program enters into a transitional state: the previous task just finishes, and a new one is about to start. If the stack is cleared at this moment, the new task will not be burdened with memory consumption from garbage.

An example of this embodiment is as follows. Suppose there is a while loop in the main( ) or Thread.run( ) method. For each iteration, there is a heavy task that may grow the stack intensively. At the end of the loop body, the stack gets back to its initial depth. At this moment, there might be many dead references on the stack and thus, this would be a good time to clear these dead references.

A second example is as follows. Assume a system with several worker threads scheduled in an uneven manner. The worker threads may wait on a queue after they finish some work on large objects (or a large object group like trees, linked lists, or the like). The references to these objects are left on the thread's stack for a long time until the thread is activated again. Embodiments herein may clear these references when the wait method traps into the prologue of its native stub.

The stack size threshold compared to the current stack depth may be assigned with an empirical value. Since the stack grows and shrinks dynamically, a fixed value for the stack size threshold for all applications and the applications' methods may not be used. In one embodiment, the value may be determined statically by profiling an application offline. In this embodiment, the stack size threshold value may accompany an application and its methods and be assigned to the stack size threshold at compile time by the execution environment.

In another embodiment, the value of the stack size threshold may be assigned dynamically. To minimize the overhead associated with good_timing_for_clearing( ), a register may be used to store the stack size threshold value. Usually, less overhead and faster execution occurs when the stack size threshold is compared against a register instead of a memory holding the stack size threshold value.

In an embodiment of an Intel Architecture 32 (IA32) system, one or more registers may be reserved, such as a segment register FS, as "not for use", for storing the stack size threshold value. In another embodiment, EE 104 may make a register reservation. Usually, EE 104 may make the register reservation as long as JIT compiler 120 does not use the register in the code generation and EE 104 can maintain the stack size threshold value during native-JIT compiled code transition.

In yet another embodiment, the value of the stack size threshold may be assigned dynamically on a per thread case. This particular embodiment provides more granularity because different threads have different stack usage in the same application.

Amount of Stack to Clear by Stack Clearing Code

In one embodiment, a factor in the execution of the stack clearing code do_stack_clearing( ) is the amount of stack to clear. In clearing the stack, the stack may be swept from the current stack pointer to the topmost position of the stack. This stack clearing distance may not be a fixed value. A stack clearing distance may be assigned in various ways. Similarly, as described above in connection with a stack size threshold value, the stack clearing distance may be determined statically, dynamically, or dynamically on a per thread basis to determine the stack clearing distance.

For example, in a dynamic embodiment, the distance between the current stack pointer and the top of the stack may be maintained in a reserved register by EE 104 as described previously. When the stack clearing code is executed, the code may refer to the register to determine the amount of stack to clear. In this way, the stack clearing code is does not waste time trying to clear stack slots that are beyond the current top of the stack. In another embodiment, the stack clearing size is dynamically determined on a per thread basis where each thread has its own associated stack.

Embodiment of Executing Method with Inserted Stack Clearing Code

Figure 5:
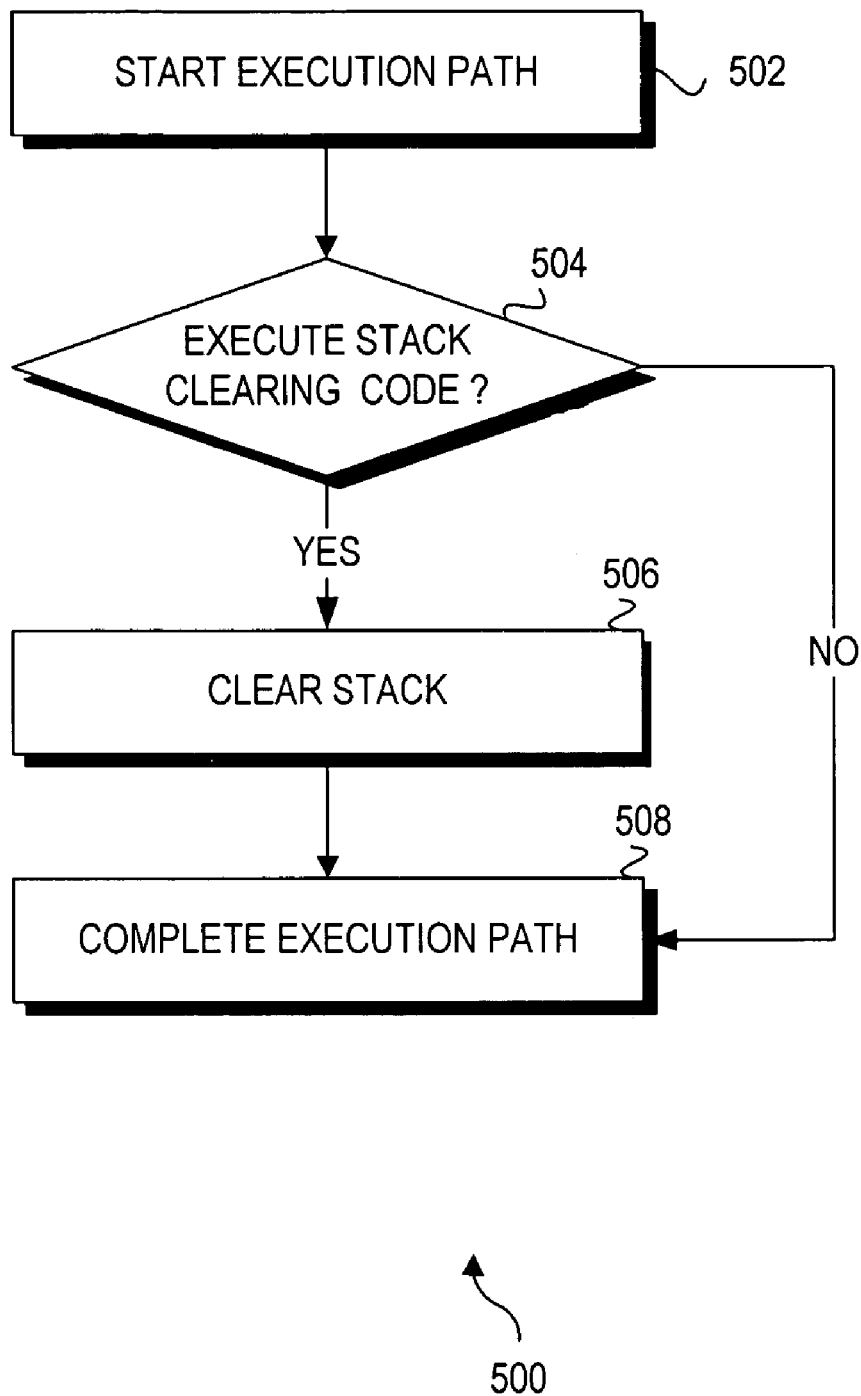
FIG. 5 is a flowchart illustrating the logic and operations of executing stack clearing code in accordance with an embodiment of the invention.

Turning to FIG. 5, a flowchart 500 of an embodiment of executing a method with inserted stack clearing code is shown. Starting in a block 502, an execution path is started. The execution path may reside in the prologue, epilogue or at certain loop back-edges of a method's code in the main body or a stub code. Continuing to a decision block 504, the logic determines if the stack clearing code is to be executed. In one embodiment, decision block 504 determines if good_timing_for_clearing( ) is returned true.

If the answer to decision block 504 is no, then the logic continues to a block 508 to complete execution of the execution path.

If the answer to decision block 504 is yes, the stack clearing code is executed to clear the stack. One skilled in the art will appreciate various techniques that may be used to scan and clear the stack, for example, the C runtime call "memset". In one embodiment, the amount of stack to clear is determined dynamically during the logic of block 506. After block 506, the logic continues to block 508 to complete the execution path.

Embodiments of a Computer System

Figure 6:
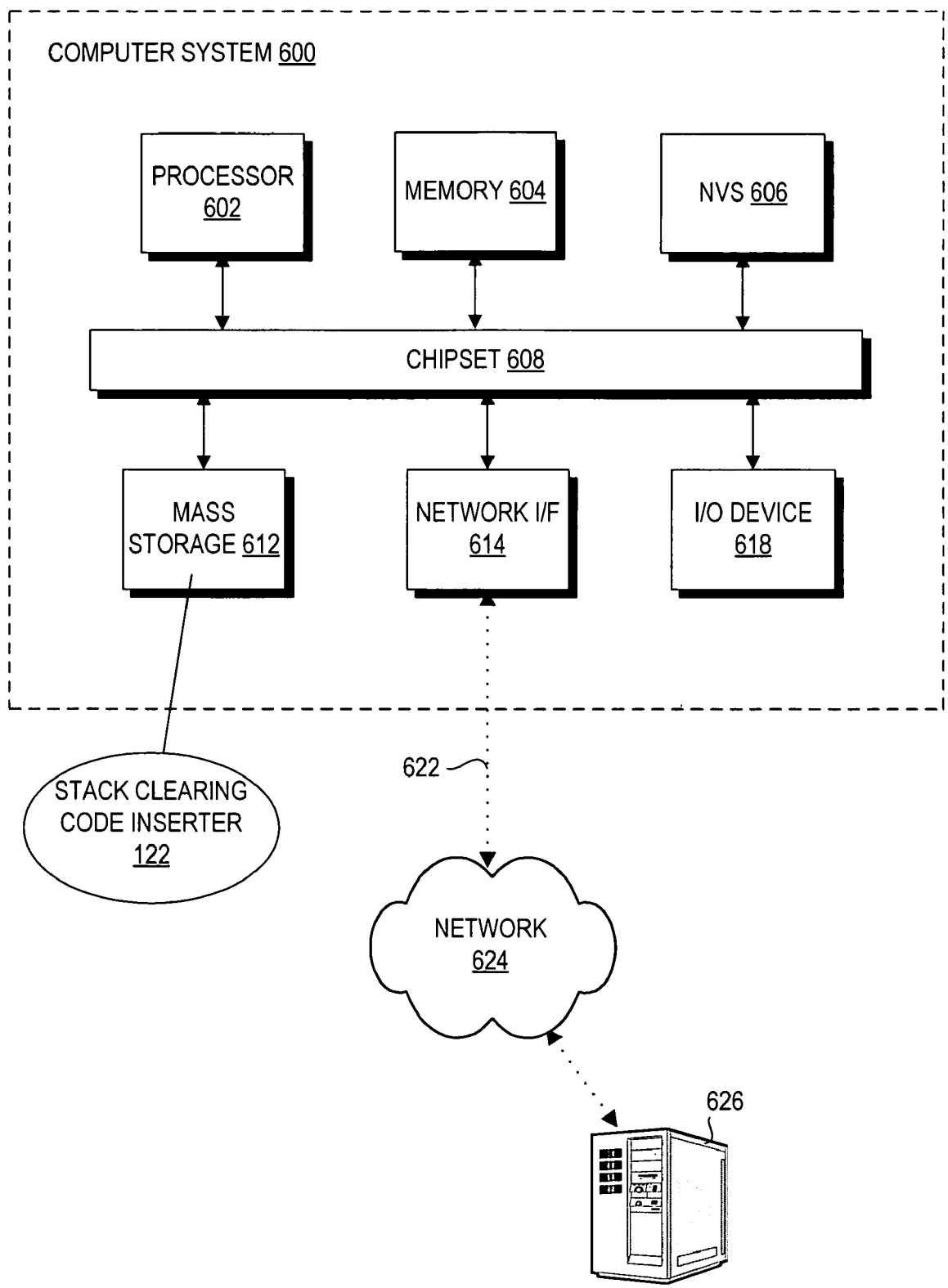
FIG. 6 illustrates embodiments of a computer system for implementing embodiments of the invention.

FIG. 6 illustrates embodiments of a computer system 600 on which embodiments of the present invention may be implemented. Computer system 600 includes a processor 602 and a memory 604 coupled to a chipset 608. Mass storage 612, Non-Volatile Storage (NVS) 606, network interface (I/F) 614, and Input/Output (I/O) device 618 may also be coupled to chipset 608. Embodiments of computer system 600 include, but are not limited to, a desktop computer, a notebook computer, a server, a mobile device, such as a mobile phone, or the like. In one embodiment, computer system 600 includes processor 602 coupled to memory 604, processor 602 to execute instructions stored in memory 604. In another embodiment, instructions for implementing stack clearing code inserter 122 are stored on mass storage 612.

Processor 602 may include, but is not limited to, an Intel® Corporation x86, Pentium®, Xeon®, or Itanium® family processor, or the like. In one embodiment, computer system 600 may include multiple processors. In another embodiment, processor 602 may include two or more processor cores.

Memory 604 may include, but is not limited to, Dynamic Random Access Memory (DRAM), Static Random Access Memory (SRAM), Synchronized Dynamic Random Access Memory (SDRAM), or the like. In one embodiment, memory 604 may include one or more memory units that do not have to be refreshed.

Chipset 608 may include a memory controller, such as a Memory Controller Hub (MCH), an input/output controller, such as an Input/Output Controller Hub (ICH), or the like. In an alternative embodiment, a memory controller for memory 604 may reside in the same chip as processor 602. Chipset 608 may also include system clock support, power management support, audio support, graphics support, or the like. In one embodiment, chipset 608 is coupled to a board that includes sockets for processor 602 and memory 604.

Components of computer system 600 may be connected by various interconnects, such as a bus. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 618 may include a keyboard, a mouse, a display, a printer, a scanner, or the like.

Computer system 600 may interface to external systems through network interface 614 using a wired connection, a wireless connection, or any combination thereof. Network interface 614 may include, but is not limited to, a modem, a Network Interface Card (NIC), or the like. Network interface 614 may include a wireless communication module. The wireless communication module may employ a Wireless Application Protocol to establish a wireless communication channel. The wireless communication module may implement a wireless networking standard.

A carrier wave signal 622 may be received/transmitted by network interface 614. In the embodiment illustrated in FIG. 6, carrier wave signal 622 is used to interface computer system 600 with a network 624, such as a Local Area Network (LAN), a Wide Area Network (WAN), the Internet, or any combination thereof. In one embodiment, network 624 is further coupled to a computer system 626 such that computer system 600 and computer system 626 may communicate over network 624.

Computer system 600 also includes non-volatile storage 606 on which firmware may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

Mass storage 612 includes, but is not limited to, a magnetic disk drive, such as a hard disk drive, a magnetic tape drive, an optical disk drive, or the like. It is appreciated that instructions executable by processor 602 may reside in mass storage 612, memory 604, non-volatile storage 606, or may be transmitted or received via network interface 614.

In one embodiment, computer system 600 may execute an Operating System (OS). Embodiments of an OS include Microsoft Windows®, the Apple Macintosh® operating system, the Linux® operating system, the Unix® operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.). In addition, a machine-accessible medium may include non-transitory propagated signals such as electrical, optical, acoustical or other forms of non-transitory propagated signals (e.g., carrier waves, infrared signals, digital signals, etc.).

Various operations of embodiments of the present invention are described herein. These operations may be implemented using hardware, software, or any combination thereof. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that if executed by a machine, will cause the machine to perform the operations described. The order in which some or all of the operations are described should not be construed. as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising: determining a location to insert stack clearing code into a method to be executed in an execution environment of a computer system; inserting the stack clearing code into the location of the method; and executing the stack clearing code during execution of the method to clear a stack; wherein determining a location to insert stack clearing code includes an insertion policy selected from the group consisting of 1) inject code into a prologue method or an epilogue method, where an overhead per method is $T+C*P$; 2) inject code into both a prologue method and an epilogue method, where an overhead per method is $2*(T+C*P)$; or 3) inject code at a loop back-edge, where an overhead would be $L*(T+C*P)$, wherein an average loop count is L and overheads from good timing, for clearing( ) and do stack clearing( ) are T and C respectively, and a probability for good timing for clearing( ) to return true is P.

2. The method of claim 1, further comprising performing the code insertion in response to heap pressure.

3. The method of claim 1 wherein the method includes one of a native method or a non-native method.

4. The method of claim 1 wherein executing the stack clearing code includes determining whether to execute the stack clearing code.

5. The method of claim 4 wherein determining whether to execute the stack clearing code includes executing the stack clearing code randomly.

6. The method of claim 4 wherein determining whether to execute the stack clearing code includes executing the stack clearing code periodically.

7. The method of claim 4 wherein determining whether to execute the stack clearing code includes executing the stack clearing code when a stack size threshold exceeds a size of the stack.

8. The method of claim 7 wherein the stack size threshold is determined statically by profiling the method offline.

9. The method of claim 7 wherein the stack size threshold is adjusted dynamically during execution of the method.

10. The method of claim 9 wherein the stack size threshold is adjusted dynamically on a per thread basis, wherein each thread has an associated stack.

11. The method of claim 1 executing the stack clearing code includes clearing the stack a stack clearing distance.

12. The method of claim 11 wherein the stack clearing distance is determined statically by profiling the method offline.

13. The method of claim 11 wherein the stack clearing distance is adjusted dynamically during execution of the method.

14. The method of claim 13 wherein the stack clearing distance is adjusted dynamically on a per thread basis, wherein each thread has an associated stack.

15. An article of manufacture, comprising: a non-transitory machine-accessible medium including instructions that, if executed by a machine, cause the machine to perform operations comprising: determining a location to insert stack clearing code into a method to be executed in an execution environment of the machine; inserting the stack clearing code into the location of the method; and executing the stack clearing code during execution of the method to clear a stack; wherein determining a location to insert stack clearing code includes an insertion policy selected from the group consisting of 1) inject code into a prologue method or an epilogue method, where an overhead per method is $T+C*P$; 2) inject code into both a prologue method and an epilogue method, where an overhead per method is $2*(T+C*P)$; or 3) inject code at a loop back-edge, where an overhead would be $L*(T+C*P)$, wherein an average loop count is L and overheads from good timing, for clearing( )and do stack clearing( )are T and C respectively, and a probability for good timing for clearing( )to return true is P.

16. The article of manufacture of claim 15 wherein the machine-accessible medium further includes instructions that, if executed by the machine, cause the machine to perform operations comprising: performing the code insertion in response to heap pressure.

17. The article of manufacture of claim 15 wherein executing the stack clearing code includes determining whether to execute the stack clearing code.

18. The article of manufacture of claim 17 wherein t determining whether to execute the stack clearing code includes executing the stack clearing code when a stack size threshold exceeds a size of the stack.

19. The article of manufacture of claim 15 wherein executing the stack clearing code includes clearing the stack a stack clearing distance, wherein the stack clearing distance is determined dynamically from a current size of the stack.

20. The article of manufacture of claim 15 wherein the instructions are part of a just-in-time compiler.

21. A computer system, comprising: a processor; and a magnetic storage unit coupled to the processor, wherein the magnetic storage unit includes instructions that, if executed by the processor, will cause the processor to perform operations comprising: determining a location to insert stack clearing code into a method to be executed in an execution environment of the computer system; inserting the stack clearing code into the location of the method; and executing the stack clearing code during execution of the method to clear a stack; wherein determining a location to insert stack clearing code includes an insertion policy selected from the group consisting of 1) inject code into a prologue method or an epilogue method, where an overhead per method is $T+C*P$; 2) inject code into both a prologue method and an epilogue method, where an overhead per method is $2*(T+C*P)$; or 3) inject code at a loop back-edge, where an overhead would be $L*(T+C*P)$, wherein an average loop count is L and overheads from good timing, for clearing( )and do stack clearing( ) are T and C respectively, and a probability for good timing for clearing( ) to return true is P.

22. The computer system of claim 21 wherein executing the stack clearing code includes executing the stack clearing code when a stack size threshold exceeds a size of the stack.

23. The computer system of claim 21 wherein executing the stack clearing code includes clearing the stack a stack clearing distance, wherein the stack clearing distance is determined dynamically from a current size of the stack.

* * * * *